US011805560B2

(12) United States Patent
Narayanasamy Naidu

(10) Patent No.: US 11,805,560 B2
(45) Date of Patent: Oct. 31, 2023

(54) PEER TO PEER COMMUNICATION SYSTEM

(71) Applicant: MOTOR RECORD LIMITED, Weybridge (GB)

(72) Inventor: Rajarajan Narayanasamy Naidu, Weybridge (GB)

(73) Assignee: MOTOR RECORD LIMITED, Surrey (GB)

( * ) Notice: Subject to any disclaimer, the term of this patent is extended or adjusted under 35 U.S.C. 154(b) by 104 days.

(21) Appl. No.: 17/049,015

(22) PCT Filed: Apr. 8, 2019

(86) PCT No.: PCT/EP2019/058842
§ 371 (c)(1),
(2) Date: Oct. 19, 2020

(87) PCT Pub. No.: WO2019/201651
PCT Pub. Date: Oct. 24, 2019

(65) Prior Publication Data
US 2021/0251027 A1    Aug. 12, 2021

(30) Foreign Application Priority Data
Apr. 20, 2018    (GB) .................................... 1806447

(51) Int. Cl.
*H04W 76/14*    (2018.01)
*H04W 4/80*    (2018.01)
(Continued)

(52) U.S. Cl.
CPC ............. *H04W 76/14* (2018.02); *H04W 4/80* (2018.02); *H04W 8/005* (2013.01); *H04W 76/11* (2018.02)

(58) Field of Classification Search
CPC ....... H04W 76/14; H04W 4/80; H04W 8/005; H04W 76/11; H04L 67/1063
See application file for complete search history.

(56) References Cited

U.S. PATENT DOCUMENTS 8,468,349 B2    6/2013  Kageyama et al.
8,726,171 B1 *  5/2014  Lachapelle ......... H04M 1/2748
                                                  715/752
(Continued)

FOREIGN PATENT DOCUMENTS

EP    2 827 646 A1    1/2015
EP    3 133 843 A1    2/2017
EP    3 229 549 A1    10/2017

*Primary Examiner* — Steven Hieu D Nguyen
(74) *Attorney, Agent, or Firm* — BakerHostetler

(57) ABSTRACT

A communication system includes a server on which there is stored a second device identifier, ID, for a second wireless device and a second user ID associated with a second user; wherein upon the server identifying that the second user ID is stored on a first wireless device, transmitting the second user ID and the second wireless device ID to the first wireless device to allow the first wireless device to associate the second wireless device with the second user; and wherein upon the first wireless device identifying that the second wireless device is within peer to peer communication range of the first wireless device, the first wireless device is arranged to provide an indication that the second wireless device is available for establishing a connection with the first wireless device for communicating with the second user.

14 Claims, 3 Drawing Sheets

(51) Int. Cl.
*H04W 76/11* (2018.01)
*H04W 8/00* (2009.01)

(56) References Cited

U.S. PATENT DOCUMENTS

| | | | |
|---|---|---|---|
| 9,614,915 B2 | 4/2017 | Jain | |
| 2004/0193601 A1* | 9/2004 | Hu | G06Q 10/10 |
| | | | 707/999.009 |
| 2010/0121954 A1* | 5/2010 | Yang | H04L 63/101 |
| | | | 709/225 |
| 2011/0282989 A1 | 11/2011 | Geirhofer et al. | |
| 2012/0311686 A1 | 12/2012 | Medina et al. | |
| 2014/0057667 A1* | 2/2014 | Blankenship | H04W 8/005 |
| | | | 455/500 |
| 2014/0092885 A1* | 4/2014 | Venkatachalam | H04W 8/005 |
| | | | 370/338 |
| 2014/0206348 A1* | 7/2014 | Johnsson | H04W 8/005 |
| | | | 455/434 |
| 2014/0213221 A1* | 7/2014 | Chai | H04W 72/53 |
| | | | 455/411 |
| 2014/0213306 A1* | 7/2014 | Blankenship | H04W 4/023 |
| | | | 455/457 |
| 2014/0357269 A1* | 12/2014 | Zhou | H04W 76/14 |
| | | | 455/434 |
| 2015/0019726 A1* | 1/2015 | Zhou | H04W 76/10 |
| | | | 709/224 |
| 2015/0079899 A1 | 3/2015 | Hakola et al. | |
| 2015/0079976 A1* | 3/2015 | Isobe | H04W 4/029 |
| | | | 455/552.1 |
| 2015/0105088 A1* | 4/2015 | Isobe | H04W 76/14 |
| | | | 455/450 |
| 2016/0050703 A1* | 2/2016 | Johnsson | H04W 8/005 |
| | | | 370/329 |
| 2016/0094963 A1 | 3/2016 | Gupta | |
| 2016/0119769 A1 | 4/2016 | Gustafsson et al. | |
| 2016/0165426 A1* | 6/2016 | Yamazaki | H04W 48/16 |
| | | | 455/434 |
| 2019/0090175 A1* | 3/2019 | Mestanov | H04W 4/023 |

* cited by examiner

PEER TO PEER COMMUNICATION SYSTEM

CROSS-REFERENCE TO RELATED APPLICATIONS

This application is a National Stage of International patent application PCT/EP2019/058842, filed on Apr. 8, 2019, which claims priority to foreign Great Britain patent application No. GB 1806447.7, filed on Apr. 20, 2018, the disclosures of which are incorporated by reference in their entirety.

FIELD

This invention relates to a system and a method for peer to peer communication.

BACKGROUND

Short-range wireless communication systems, for example Wi-Fi Direct™ and Bluetooth™, provide users with opportunities for peer to peer communication. Such peer to peer sharing of data is between devices without any intermediary, that is without the involvement of a Wi-Fi™ router, or a node or base station in LTE. U.S. Pat. No. 9,614,915 B2 is an example of a peer to peer connection service using Wi-Fi Direct™. In that patent, there is described a method of connecting a user device to a peer to peer (P2P) communication session provided by a host device, wherein the host device has a better data connection to a network than the user device, and the peer to peer communication session is used to provide improved data connection to the user device by sending data to the user device from the network via the host device. Such an arrangement has many benefits, but is dependent on the host device behaving as a relay for information required from the network by the user device. If no host devices are available, the user device will not receive data in the peer to peer communication session. Furthermore, in that patent application it is not disclosed that a first user of a first device can send data directly to a second device.

U.S. Pat. No. 8,468,349 B2 is an example of a peer to peer communication system where content is shared between user devices. In that patent, there is described an authentication system for allowing and/or denying access of a user and their device to a communication group.

US 2014/0357269 A1 is an example of a peer to peer communication system wherein a first user device sends a peer to peer discovery request via a base station or network node. The base station or node responds with a list of nearby candidate devices.

The number of devices which are WiFi Direct™ or Bluetooth™ enabled is rapidly increasing, particularly in machine type communication (MTC) scenarios. For example, remote controls for television sets and wireless mice for computers increasingly employ WiFi Direct™ or Bluetooth™. To establish a peer to peer communication between devices using WiFi Direct™ or Bluetooth™ a first wireless device is typically used to search for nearby devices. A device may discover a proliferation of WiFi Direct™ or Bluetooth™ enabled devices upon searching for nearby devices. If the first wireless device is a user device, the user of that device is likely to desire to connect with a specific user known to him. However, it can often be difficult for the user of the first device to determine which device to connect to because the search results are presented to him as a list of device identities discovered in the search for nearby devices. It is an object of the present invention to make it simpler and quicker for a user of a device to establish a peer to peer connection to send data to a second user.

SUMMARY OF THE INVENTION

In accordance with a first aspect of the invention, a communication system is provided for identifying a second wireless device of a second user and alerting a first wireless device to the presence of the second wireless device. The communication system comprises: a server on which there is stored a second device identifier, ID, for the second wireless device and a second user ID associated with a second user; wherein upon the server identifying that the second user ID is stored on the first wireless device, transmitting the second user ID and the second wireless device ID to the first wireless device to allow the first wireless device to associate the second wireless device with the second user; and wherein upon the first wireless device identifying that the second wireless device is within peer to peer communication range of the first wireless device, the first wireless device is arranged to provide an indication that the second wireless device is available for establishing a connection with the first wireless device for communicating with the second user.

A peer to peer communication can be set up between devices by a first user who merely has to recognise a second user ID of a second user rather than the device ID of the second user's device. Once the first device ID is associated with the first user ID and stored on the second device, and the second device ID is associated with the second user ID and stored on the first device, then a peer to peer communication session may be set up between such mutually registered devices without any interaction with a server, node, satellite, or router, for example when such access points are out of range or unavailable. Such a system may save money for users of said devices by sending data via a direct peer to peer connection rather than via a network. The system also provides a simpler and quicker method for a user to set up a peer to peer communication because the user merely has to recognise a user ID and does not have to recognise long and complicated device IDs.

A method of communication in a communication system is also provided. The method of communication comprising a first wireless device and a second wireless device, wherein the second wireless device has a second wireless device ID and is associated with a second user ID to indicate that a second user is using the second wireless device. The method comprising: identifying, by a server, that the second user ID is stored on the first wireless device; transmitting, by the server, the second user ID and the second wireless device ID to the first wireless device upon the server identifying that the second user ID is stored on the first wireless device; associating, by the first wireless device, the second wireless device with the second user; identifying, by the first wireless device, that the second wireless device is within peer to peer communication range of the first wireless device; and displaying, by the first wireless device, an indication that the second user is available for peer to peer communication based on the identifying.

In some examples of the communication system or method described herein following the indication that the second wireless device is available for establishing a connection, the first wireless device is arranged to establish a peer to peer communication with the second wireless device for communicating with the second user. Additionally or alternatively, in some examples the peer to peer communication comprises a WiFi direct connection or a Bluetooth connection. Data may be shared between users over the connection without monetary cost, bandwidth usage, or delays related to communication of the data via a base station or router.

In some examples of the communication system or method described herein, a third wireless device is arranged to transmitting to the server a third wireless device ID associated with the second user ID to indicate that the second user is using the third device; the server is arranged to store the third wireless device ID with the second user ID; and the server is arranged to transmit the second user ID and the third wireless device ID to the first wireless device. Additionally or alternatively, in some examples the second wireless device ID may be deleted from the first wireless device and/or from the server. Additionally or alternatively, the server is arranged to store both the second wireless device ID and the third wireless device ID with the second user ID, and wherein the server is arranged to transmit either the second wireless device ID and the second user ID to the first wireless device if the second wireless device was most recently used by the second user, or the server is arranged to transmit the third wireless device ID and the second user ID to the first wireless device if the third wireless device was most recently used by the second user. Conveniently, the system and method updates the device ID to a newly used or the most recently used device of each user, to allow users to send data to the device most likely to be in use, and does so without input from users themselves and the corresponding inconvenience to the users.

In some examples of the communication system or method described herein, the server is arranged to transmit a code to the first wireless device and to the second wireless device; the first wireless device is arranged to transmit the code to the second wireless device, and wherein first wireless device is arranged to display an indication that the second user is available for peer to peer communication and the indication is displayed when the code sent by the first wireless device to the second wireless device matches the code sent by the server to the second wireless device and when the second wireless device is in peer to peer communication range of the first wireless device. Transmission of the code helps to ensure secure communication and ensures that, during initial setup, the correct device IDs are provided to the correct devices, and ultimately that the two or more users wishing to connect are connected to each other correctly. The code can also be used to prevent a third party from connecting with a user on the basis of a user ID alone.

In some examples of the communication system or method described herein, the peer to peer communication session may be closed when the second wireless device is out of peer to peer communication range of the first wireless device. Additionally or alternatively, the first wireless device is arranged to automatically display an indication that the second wireless device is not in peer to peer communication range of the first wireless device. This indication is displayed once the peer to peer communication session is closed, it may also be shown when the devices are out of peer to peer communication range. Conveniently, a user can easily and quickly view the user IDs of the users which he has previously communicated with and which of these are in peer to peer communication range. Additionally or alternatively, the first wireless device is arranged to automatically re-establish a peer to peer communication session when the second wireless device is in peer to peer communication range of the first wireless device. Thus, users may simply and quickly re-establish or resume a peer to peer communication session once their devices are within range of each other.

In some examples of the communication system or method described herein, the first wireless device or the second wireless device is arranged to close the peer to peer communication session in response to input from a user of the first wireless device or the second wireless device. Conveniently, a user may close the peer to peer communication session whenever he desires.

In some examples of the communication system or method described herein, the first wireless device or the second wireless device is arranged to delete data shared in the session from the server and receiving device. Conveniently, any sensitive data may be deleted from the server and the receiving device by the sending device.

In some examples of the communication system or method described herein, if the second wireless device is not within peer to peer communication range, then the first wireless device and the second wireless device communicate via a router or a base station. Additionally or alternatively, if the second wireless device moves out of peer to peer communication range of the first wireless device, then the first wireless device and the second wireless device are arranged to communicate via a router or a base station. Users may seamlessly continue to share data with one another after moving out of peer to peer communication range by their wireless devices switching to long range communication techniques.

In some examples of the communication system or method described herein the wireless device ID is a MAC address, a Subscriber Identity Module number, SIM, a service set identifier, SSID, internet protocol, IP, address, or any combination thereof. Wireless devices recognise each other by their wireless device IDs, while displaying to the user a corresponding user ID, conveniently this means that a user merely has to recognise a user ID, which may simply be the user's name.

In some examples of the communication system or method described herein, wherein the second wireless device is within peer to peer communication range of the first wireless device when the distance between the first wireless device and the second wireless device is less than 50 metres or when a signal strength for peer to peer communication between the first wireless device and the second wireless device is above a threshold level. Peer to peer communication takes place directly between devices when the devices are within range of one another, this reduces costs for the user's who may otherwise be charged for communicating via a router or base station.

Other features and advantages of the invention will become apparent after review of the entire application, including the following sections: brief description of the drawings, detailed description and claims.

BRIEF DESCRIPTION OF THE DRAWINGS

The accompanying drawings illustrate exemplary aspects of the invention, and, together with the general description given above and the detailed description given below, serve to explain features of the invention.

DETAILED DESCRIPTION

The various aspects of the invention will be described in detail with reference to the accompanying drawings by way of example only. Wherever possible, the same reference numbers will be used throughout the drawings to refer to the same or like parts. References made to particular examples and implementations are for illustrative purposes, and are not intended to limit the scope of the invention or the claims.

Figure 1:
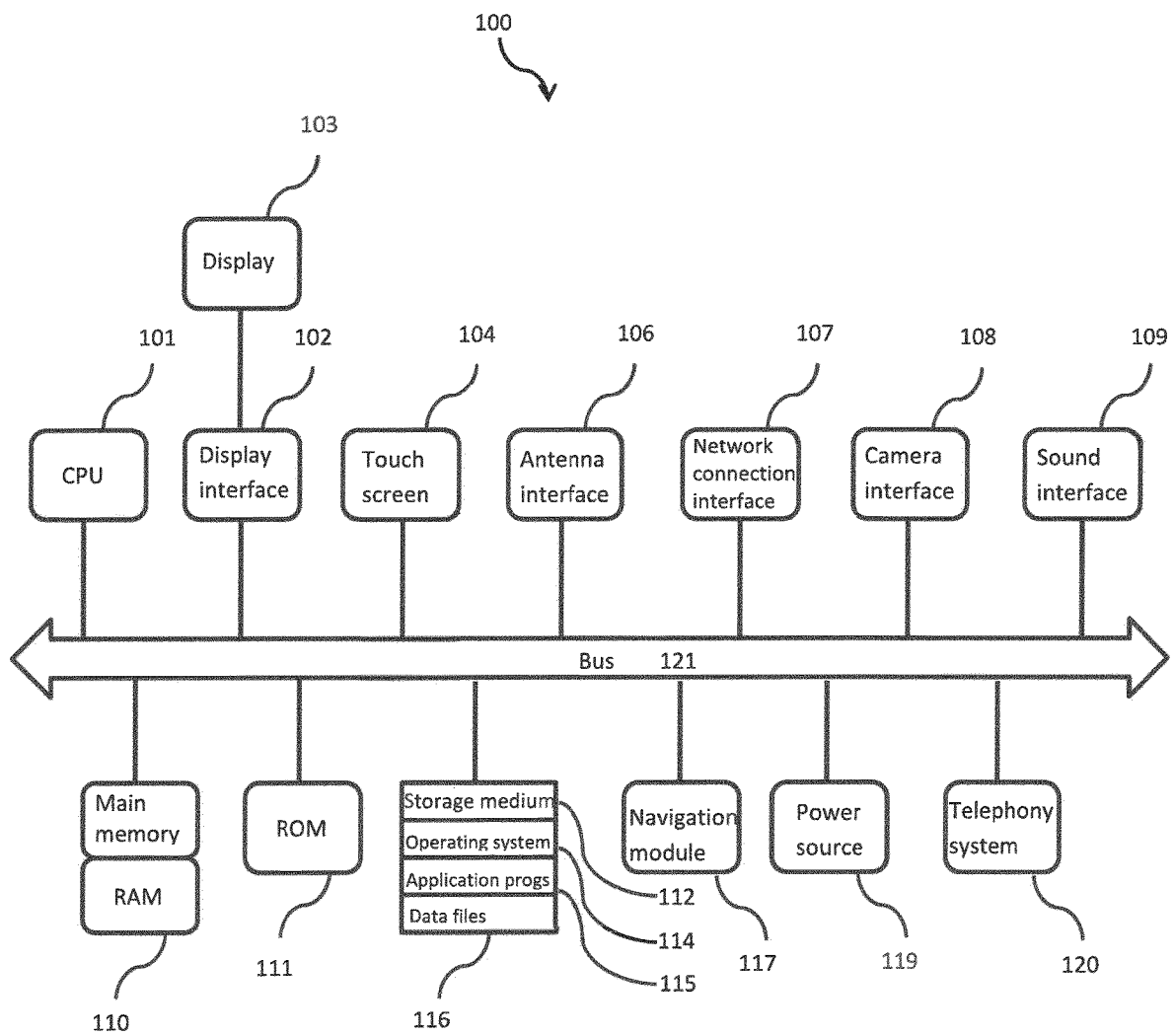
FIG. 1 is a block diagram illustrating the internal architecture of a wireless device.

FIG. 1 is a block diagram illustrating an internal architecture 100 of a device. The architecture includes a central processing unit (CPU) 101 where the computer instructions that comprise an operating system or an application are processed; a display interface 102 that provides a communication interface and processing functions for rendering video, graphics, images, and texts on a display 103. Display interface 102, provides a set of built-in controls (such as buttons, text and lists), and supports diverse screen sizes. There is a touch screen 104 that overlays the display 103 and provides a communication interface to the device. There is also: an antenna interface 106 that provides a communication interface to an antenna; a network connection interface 107 that provides a communication interface to a network over a computer network connection; a camera interface 108 that provides a communication interface and processing functions for capturing digital images from a camera; a sound interface 109 that provides a communication interface for converting sound into electrical signals using a microphone and for converting electrical signals into sound using a speaker; a random access memory (RAM) 110 where computer instructions and data are stored in a volatile memory device for processing by the CPU 101; a read-only memory (ROM) 111 where invariant low-level systems code or data for basic system functions such as basic input and output (I/O), startup; and a storage medium 112 or other suitable type of fixed or removable memory (e.g. RAM, ROM, PROM, EPROM), where files are stored. The files include an operating system 114, application programs 115 (including, for example, a web browser application, a widget or gadget engine, and or other applications, as necessary) and data files 116. Also shown are: a navigation module 117 that provides a real-world or relative position or geographic location of the device; a power source 119 that provides an appropriate alternating current (AC) or direct current (DC) to power components; and a telephony subsystem 120 that allows the device to transmit and receive sound over a telephone network. The constituent devices and the CPU 101 communicate with each other over a bus 121.

A computer program product is tangibly embodied in storage medium 112, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device. The notifications can be audible, visual, or vibrations of the wireless device.

The operating system 114 is modified from an ANDROID (trademark) and/or LINUX-based operating system such as a mobile device platform; APPLE MAC OS X; MICROSOFT WINDOWS NT/WINDOWS 2000/WINDOWS XP/WINDOWS MOBILE (trademarks); a variety of UNIX-flavored operating systems; or a proprietary operating system for computers or embedded systems. The application development platform or framework for the operating system 114 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact (trademarks), or another appropriate environment.

The device stores computer-executable code for the operating system 114, and the application programs 115 such as an email, instant messaging, a video service application, a mapping application, word processing, spreadsheet, presentation, gaming, mapping, web browsing, JAVASCRIPT engine, or other applications. For example, one implementation may allow a user to access an email application, an instant messaging application, a video service application, a mapping application, or an image editing and presentation application.

The navigation module 117 may determine an absolute or relative position of the device, such as by using the Global Positioning System (GPS) signals. The navigation module 117 may also be used to measure angular displacement, orientation, or velocity of the device, such as by using one or more accelerometers.

Figure 2:
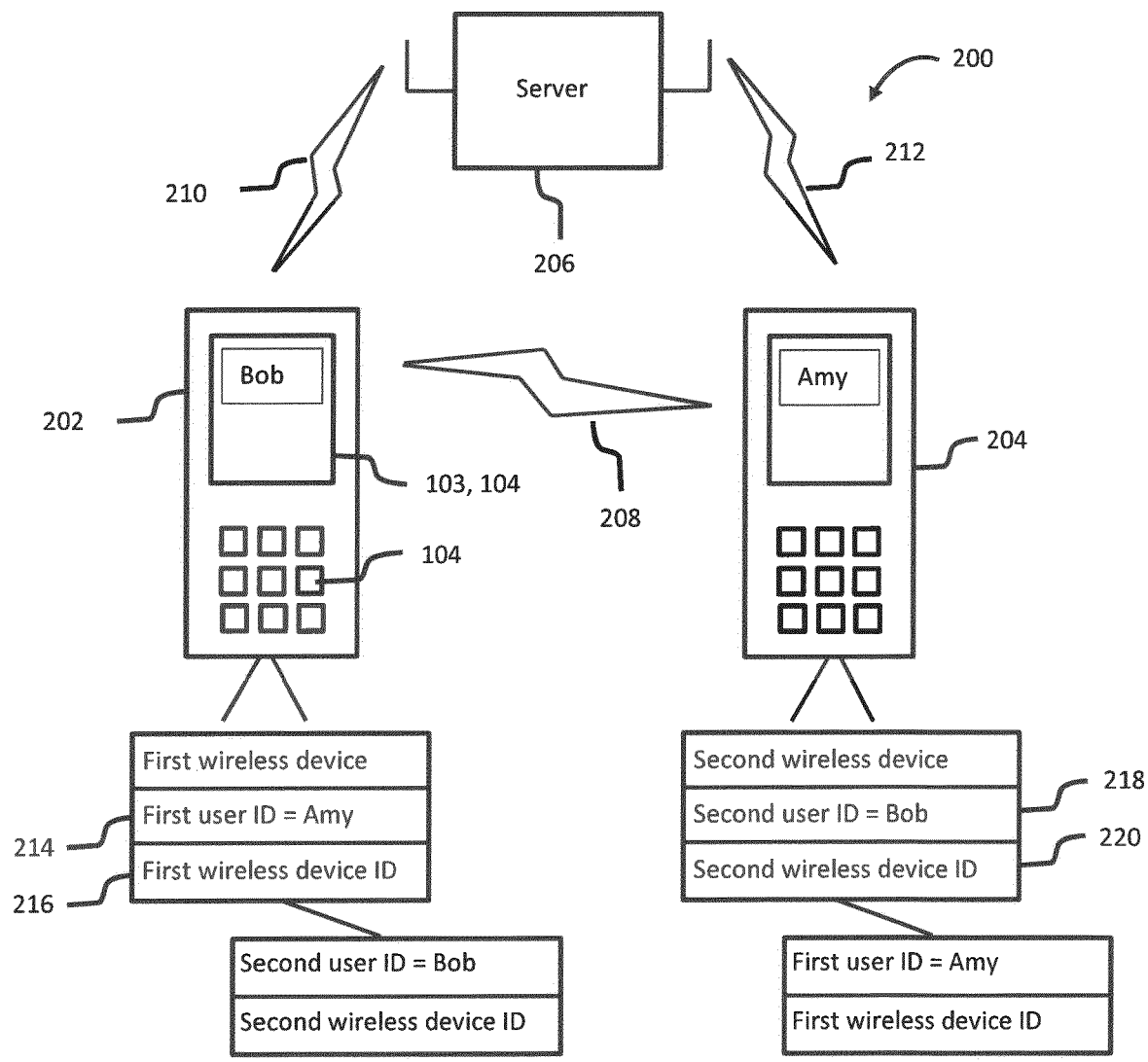
FIG. 2 is a schematic of a communication system.

FIG. 2 is a schematic illustrating aspects of the communication system 200 described herein. A first wireless device 202 and a second wireless device 204 may be a mobile telephony devices having the architecture 100 described with reference to FIG. 1, or may alternatively be a pager, tablet computer, portable laptop computer, or similar portable electronic communication device. The first wireless device 202 and the second wireless device 204 may be in communication with each other, represented by 208, and/or with a server 206, represented by 210 and 212. The communication 208 is herein referred to as a peer to peer communication.

The communication 208 between the first wireless device and the second wireless device are direct communications. Data sent from the first wireless device to the second wireless device does not comprise the data being sent via an intermediary, such as a router, base station, or other network node. Communication 208 may be referred to as a short range communication, and may be a WiFi Direct™ or Bluetooth™ connection. Alternatively or additionally, the communication 208 comprises a near-field communication (NFC) connection, a Bluetooth Low Energy connection, Zigbee connection, Z-wave connection, other mesh network-type connections, or a combination thereof.

Communications 210 and 212 between the first wireless device 202 and the server 206, and between the second wireless device 204 and the server 206 may utilise a long range wireless communication method. For example, communications 210 and 212 may comprise communication over the internet via a router, or over a mobile telephony network such as a UMTS, LTE, 2G, 3G, 4G, or 5G communication via a base station, eNodeB, or other network node. Alternatively or additionally, the communications 210 and 212 comprise WiMAX, Sigfox, Neul, low power wide area networks, or a combination thereof.

The first wireless device 202 is associated with a first user. The first user has a profile which includes a first user ID 214. The first user ID 214 may be the first user's name, email address, nickname, phone number, or other identifier personal to the first user. The first wireless device 202 has a first wireless device ID 216. The first wireless device ID is unique to the first wireless device and may take the form of a media access control (MAC) address, a subscriber identity module (SIM) number, a service set identifier (SSID), internet protocol (IP) address, or a combination thereof. The second wireless 204 device is associated with a second user who has a second user ID 218, and the second wireless device 204 has a second wireless device ID 220. The second user ID 218 may be the second user's name, email address, nickname, phone number, or other identifier personal to the second user. The second wireless device ID 220 may take the form of a MAC address, a SIM number, a SSID, internet protocol (IP) address, or a combination thereof.

The server 206 is adapted to receive the user IDs 214, 218 and the wireless device IDs 216, 220 from each wireless device 202, 204. The server 206 comprises code stored on a memory device for execution by a processor to carry out the steps of the method. The server 206 stores the user IDs 214, 218 and the wireless device IDs 216, 220 from each wireless device 202, 204. The server 206 is adapted to identify that the second user ID 218 is stored on the first wireless device 202, and to send the second wireless device ID 220 along with the second user ID 218 to the first wireless device 202. The server may also send the first wireless device ID 216 with the first user ID 214 to the second wireless device 204. The server 206 may identify that the second user ID 218 is stored on the first wireless device 202 as a result of a transmission from the first wireless device 202 indicating that the second user ID 218 has been added to the first wireless device 202.

When the second wireless device 204 is in peer to peer communication range of the first wireless device 202, the first wireless device 202 is adapted to display upon its screen 103 the second user ID 218 along with an indication that the second user is available for establishing a peer to peer connection. A connection may be established and data sent by communication 208. Communication 208 is a direct peer to peer communication.

In the example of FIG. 2, the first wireless device 202 is owned by a first user having "Amy" as the first user ID 214 and the second wireless device 204 is owned by a second user having "Bob" as the second user ID 218. The first and second wireless devices 202, 204 are shown as being in peer to peer communication range and thus the second user ID 218 ("Bob") is shown on the screen of the first wireless device 202, and the first user ID 214 ("Amy") is shown on the screen of the second wireless device 204.

The server 206 may periodically send the second wireless device ID 220 along with the second user ID 218 to the first wireless device 202 and send the first wireless device ID 216 with the first user ID 214 to the second wireless device 204. Thus, when first wireless device 202 identifies that the second wireless device 204 is within peer to peer communication range, the first wireless device may display an indication that the second user is nearby and the second wireless device 204 is available for peer to peer communication. The indication can be displayed irrespective of whether the server 206 is available, and the devices may establish a peer to peer communication session. Thus, the devices may establish a peer to peer communication session when the signal strength for communication between the first wireless communication device 202 and the server 206 or between the second wireless communication device 204 and the server 206 is poor or non-existent.

Additional to the server 206 transmitting the first wireless device ID 216 and the first user ID 214 to the second wireless device 204 and transmitting the second wireless device ID 220 and the second user ID 218 to the first wireless device 202, the server 206 may transmit a code to the first wireless device 202 and the second wireless device 204. The first wireless device 202 transmits the code to the second wireless device 204 and the second wireless device compares the codes received from the server 206 and the first wireless device 202. If the comparison indicates that the codes match, then the second wireless device 204 sends and indication to the first wireless device 202 that the codes match, and the first wireless device 202 displays an indication that the second wireless device is available for peer to peer communication when the second wireless device 204 is in peer to peer communication range of the first wireless device 202. Additionally or alternatively, the second wireless device 204 may, upon the comparison indicating that the codes match, display an indication that the first wireless device 202 is available for peer to peer communication when the first wireless device 202 is in peer to peer communication range of the second wireless device 204. Additionally, the second wireless device 204 may transmit the code received from the server 206 to the first wireless device 202, wherein the first wireless device compares the codes received from the server 206 and the second device 204, if the comparison indicates that the codes match then the first wireless device 202 sends an indication to the second wireless device 204 that the codes match, and the first wireless device 202 may indicate that the second wireless device 204 is in peer to peer communication range of the first wireless device 202.

The transmission and comparison of said code improves security because it allows each user to identify a respective different user by the sending of both a user ID and a code. The code may be used to prevent a third party from connecting with a user based on a user ID alone. Additionally or alternatively, the code may not be sent directly from the first user device 202 to the second user device 204, but may be contained in a connection request from a first user to a second user. The connection request may comprise and e-mail or SMS message. The connection request is sent if the IDs of the first and second users have not previously been connected In an aspect, one of the first user or the second user may change their wireless device, for example users often upgrade their mobile telephones to newer models. The second user may change their device from the second wireless device 202 to a third wireless device (not shown in FIG. 2) having a third wireless device ID. The second user ID is associated with the third wireless device, for example because the second user has logged-in to the third wireless device using their second user ID 218. The second user ID 218 and the third wireless device ID are sent to the server 206. The server 206 associates the third wireless device ID with the second user ID. The server 206 may retain the second wireless device ID 220 alongside the third wireless device ID or the server 206 may delete the second wireless device ID 220 from its database. The server 206 automatically transmits the third wireless device ID and the second user ID 218 to the first wireless device 202. The first wireless ID updates its database to specify that the second user ID is now associated with the third wireless device ID of the third wireless device. Thus, the second user does not need to actively inform the server or the first user that he has changed from the second wireless device to the third wireless device. The first user's device may identify that the second user's device is in peer to peer communication range and establish a connection with the second user without the first user knowing that the second user has changed to using a different device.

In an aspect, one of the first or second users may own more than one device and switch between their wireless devices. For example, the second user may own a mobile telephone as the second wireless device 204 and a tablet computer as a third wireless device. The second user may initially use the second wireless device 204, and the second wireless device 204 transmits the second user ID 218 and the second wireless device ID 220 to the server 206. The server 206 identifies that the second user is using the second wireless device 204 and thus the server 206 sends the second user ID 218 and the second wireless device ID 220 to the first wireless device 202. The first wireless device 202 associates the second wireless device ID 220 with the second user ID 218 and, if in range, may execute a peer to peer communication session with the second wireless device 204.

If the second user switches to using the third wireless device, then the third wireless device transmits the second user ID 218 and the third wireless device ID to the server 206. The server 206 identifies that the second user is using the third wireless device and thus the server 206 sends the second user ID 218 and the third wireless device ID to the first wireless device 202. The first wireless device 202 associates the third wireless device ID with the second user ID 218 and, if in range, may execute a peer to peer communication session with the third wireless device. Thus, the server 206 may send the device IDs of the device which the second user is using each time the second user changes to a different wireless device. Each time the first wireless device 202 receives an indication that the second user is using a different wireless device, the first wireless device may replace the existing wireless device ID or it may maintain a list of wireless device IDs ranked by the most recently used wireless device ID. This aspect ensures that the first wireless device 202 connects to the most relevant device of the second user.

In the case that the first wireless device maintains a list of wireless device IDs associated with the second user, the first wireless device may be arranged to indicate to the first user that multiple devices associated the second user are in peer to peer communication range. By default, the first wireless device will connect with the most recently used device associated with the second user. Additionally, the first user may select which of the devices of the second user to connect to from the list of devices associated with the second user which have been determined to be in peer to peer communication range.

The peer to peer communication range refers to the range over which communication may occur directly between the first wireless device and the second wireless device, that is communication without use of an intermediary. Such communications may be a Bluetooth™ or WiFi Direct™ communication, or similar short range communication. Such short range communications may have a range of 50 metres. The range is dependent upon signal conditions, atmospheric conditions, and interference levels. The range may also depend on the frequency band, radio power output, antenna gain and antenna type as well as the modulation technique. The range may also depend upon whether two devices have a line-of-sight to one another, or whether their communication path involves reflection and refraction. WiFi Direct™ communications often occur over distances of up to 100 m, the WiFi Direct™ standards have a maximum certified range of 200 metre. Bluetooth™ typically has a maximum range of 100 metres, Bluetooth 5.0 has a maximum range of 40-400 metres. Determination of whether a first wireless device 202 and a second wireless device 204 are in peer to peer communication range may be made based on the strength of signals sent by the first wireless device 202 to the second wireless device 204. The determination may comprise a threshold signal strength or quality, wherein if signals sent from the first wireless device 202 directly to the second wireless device 204 exceed the threshold signal strength or quality, then the first and the second wireless devices are determined to be in peer to peer communication range.

During exchange of data the first wireless device 202, or the second wireless device 204, or preferably both the first and second wireless devices 202, 204 periodically determine whether the second wireless device 204 is within peer to peer communication range of the first wireless device 202. The determination is as described above. If the devices move out of peer to peer communication range, or if the peer to peer communication session is otherwise lost or interrupted, then the devices may switch to a second short range communication method or to communication on a long range communication method. For example the devices may switch to communications over the Internet via a WiFi router, or over a mobile telephony network via a base station.

The wireless communication devices are arranged to automatically check for an alternative communication method if the short range peer to peer communication session is interrupted. The devices may automatically switch to a second short range peer to peer communication method, for example if an ongoing session using Bluetooth is interrupted by loss of Bluetooth signal quality, the devices may automatically switch to communication via WiFi Direct, if available. The switch is automatic and thus may be made without user interaction.

If no other short range peer to peer communication method is available, then the devices may automatically switch to a long range communication method, without user interaction, in which case the users of the affected devices are unlikely to notice any change.

Alternatively one or both of the devices may be arranged to query the switch to a long range communication method with the user of that device. If the user of a device does not approve of the switch to a different method, for example because of cost, then the session ends. The user may also be required to select a particular long range communication method from one or more available methods.

If the devices return to being within peer to peer communication range of one another, then the devices automatically re-establish the peer to peer communication session over the short range communication method or provide a prompt to the users to re-establish peer to peer communication over the short range communication method.

The peer to peer communication session may be ended by one of the first user or the second user. A user may indicate on their respective device that data exchange is complete. A user may indicate that exchange is complete in response to a prompt generated by the device. Additionally or alternatively, the session may be ended by a timeout wherein the session ends if no data is exchanged for a period of time which is longer than a threshold period of time. The threshold period may, for instance, be 15 minutes.

The data exchanged between the first wireless device and the second wireless device may be one or more of the following types: document files, text messages, audio files, video files, drawings, location in a map, latitude/longitude, phone/video calls, and so on. The exchanged data can be saved on the wireless communication devices and can be shared via Internet to be saved by the server 208 for future retrieval from other devices associated with one or more of the users involved in the data exchange. The permission to store and/or share to others is tagged with the exchanged data. The exchanged data will be automatically deleted after closing the session if the device which sent the data does not allow storing in the receiver's device. Permissions to share exchanged data and to take screenshots of the exchanged data can also be restricted. For example, the first user may prohibit saving or sharing of exchanged data. If the user of the second wireless device takes a screenshot of the exchanged data, the first wireless device may display a warning to the first user that a screenshot has been taken. Furthermore, the taking of a screenshot by a receiving device may be controlled if a user provides root permissions to the device. For example, the first user set permissions such that taking screenshots of the exchanged data is not allowed, if the second user agrees then the device settings of the second user's wireless device are modified. The modification comprises disabling the keys required for taking screenshots on the second user's device.

Figure 3:
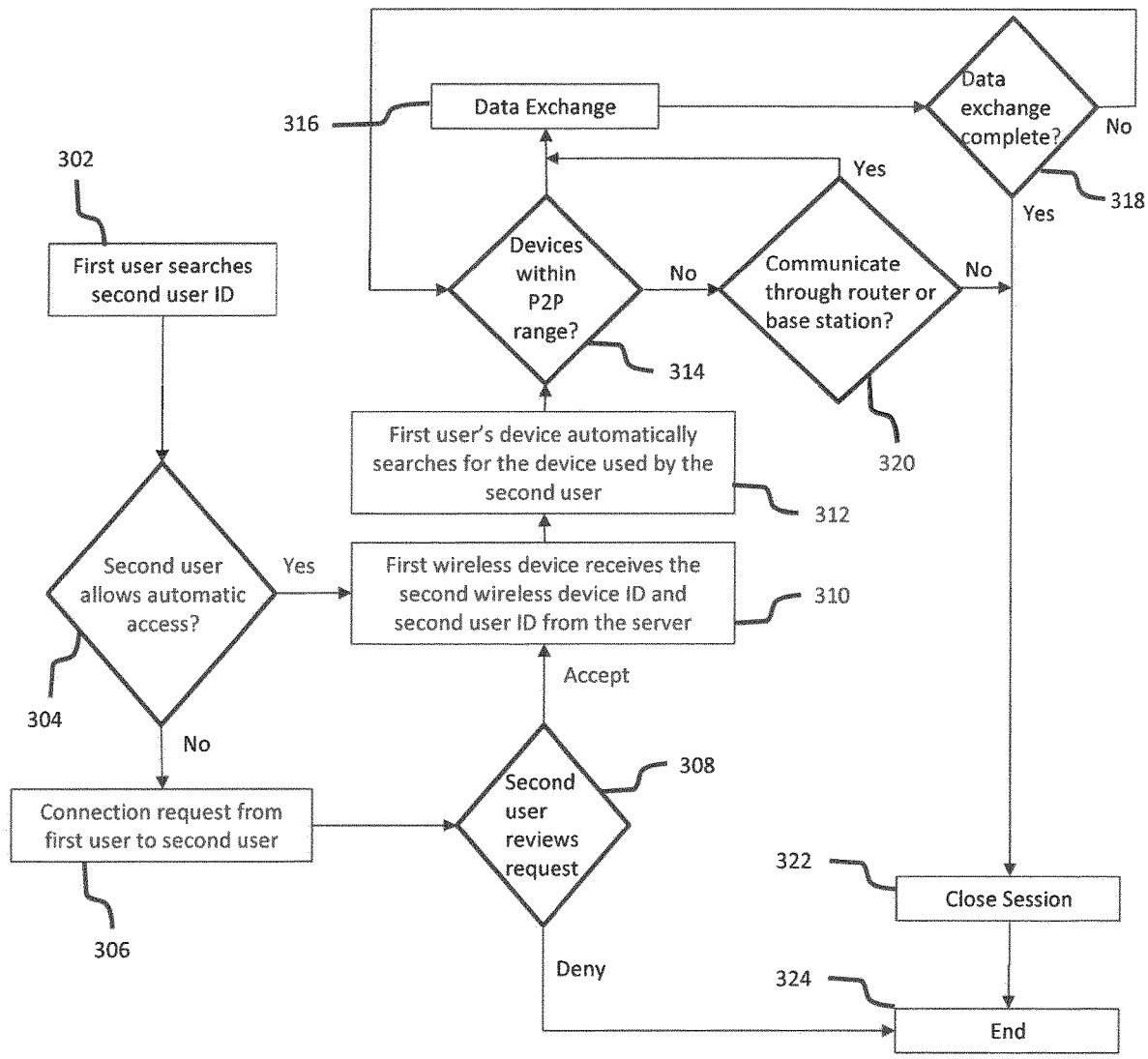
FIG. 3 is an exemplary process flow diagram illustrating an automatic connection of two devices.

FIG. 3 is an exemplary process flow diagram illustrating steps in an automatic connection of two devices for a peer to peer communication session. The first wireless device may be the first wireless device 202 and the second wireless device may be the second wireless device 204 described with reference to FIG. 2, and the first and second wireless devices may have the architecture 100 described with reference to FIG. 1.

FIG. 3 shows an aspect of the invention relating to connecting a first wireless device 202 to a second wireless device 204. At box 302, a first user may enter the second user ID 218, alternatively the second user ID 218 may already exist on the first wireless device 202. At 304 the first wireless device 202 determines whether the second wireless device 204 allows automatic access by the first wireless device 202. The first wireless device 202 may make the determination based on information stored on the first wireless device 202, or by response from the server 206 to the server 206 being informed of the first wireless device 202 searching the second user ID 218. The second user may have set the privileges of his or her device to allow previously connected devices, previously connected users, or any devices to connect automatically, in which case the first wireless device 202 receives from the server 206, at box 310, the second user ID 218 and the device ID of the device most recently used by the second user, for example the second wireless device ID 220. The first wireless device 202 stores the second wireless device ID 220 with the second user ID 218. The second wireless device 204 may also receive the first wireless device ID 216 and the first user ID 214 from the server 206, the second wireless device 204 stores the first wireless device ID 216 and the first user ID 214 as a contact.

If the second user does not allow automatic access at 304, then at 306 a connection request is sent by the first wireless device 202 to the second user. The connection request at 306 is sent using the second user ID 218, for example if the second user ID is an email address then the connection request 306 is sent to the email address of the second user. At 308 the second user receives and reviews the connection request received from the first user. If the second user denies the connection request then the process ends, at 324. If the second user allows the request then the process continues to box 310.

At box 312, the first wireless device 202 searches for the second wireless device 204 by searching for nearby wireless device IDs. At box 314 the first wireless device 202 determines whether the second wireless device was discovered in peer to peer communication range in the search at box 312. If the devices are determined to be in peer to peer communication range, then the flow continues to box 316 wherein data is exchanged between the first wireless device 202 and the second wireless device 204. The data exchanged in peer to peer communication 208 may be encrypted by the sender and decrypted by the receiver to provide secure communication. Peer to peer communication range is referred to as being when the first and second devices may communicate directly with one another, that is without the communication being passed through an intermediary. If, at box 314, the devices are determined to not be in peer to peer communication range then the process continues to 320 where a long range communication may be set up instead. For example, a long range communication may be communication via a router or base station. At box 320, the first wireless device 202 determines if a long range communication is available, and the first user is prompted whether they would like to set up a communication session in this manner. The user of the second wireless device may also receive the same prompt. The user of the first and/or second wireless device may not agree to communication via a base station or router because it may cost them money. If, at box 320, the user(s) do not agree to communicate via the router or base station then the session is closed at 322 and the process ends at 324. If, at box 320, the user(s) agree to communicate via the router or base station then data exchange commences at box 316, as described above.

From box 316, the process continues at box 318. At box 318, the first wireless device 202 or the second wireless device 204 checks whether data exchange is complete. The check may comprise a check that all data has been sent by the first and/or second wireless device, or may comprise a message to the first and second users, may be a time limit, or a combination thereof. For example, the data exchange may be determined to be complete if no data has been sent by the first wireless device or the second wireless device for longer than a threshold period of time. The threshold period may be 15 minutes. Additionally or alternatively, the first user or the second user may indicate on their respective device that data exchange is complete. If data exchange is complete then the session is closed at 322 and the process flow ends at 324. If the check at box 318 indicates that data exchange is not complete then the process flow returns to box 314 wherein it is determined if the devices are in peer to peer communication range while the data exchange continues. The skilled addressee would understand that the process flow of FIG. 3 is exemplary, and that the steps may be executed in a different order, and may include further steps, for example those described with reference to FIG. 2.

The system and method described herein may be used to directly connect mobile devices without the need of internet service provider (ISP). Content or data may thus be shared even when meeting someone in a location where ISP signal is lost or poor.

The system and method described herein may reduce power consumed by the first wireless communication device 202 and the second wireless communication device 204. The system and method allow said devices to avoid communication through an ISP or network provider which are potentially over long distances where high power may be required. Instead, it allows direct communication between electronic devices, which may have lower power requirements, in particular if the devices are situated close together or in a low noise environment. Such environments are encountered when both devices are in the same room of a building, or where the users of such devices are outside, for example if the users are hiking.

Furthermore, the system and method described herein are not limited to peer to peer communication between two devices. Three or more devices may participate in group peer to peer communication sessions. The device initiating the session may be a group leader. Group sessions may be set up for gatherings of people or in school classrooms. In a group or classroom, a teacher may be the group leader and permissions may be set such that participants or students can only send data to the group leader and cannot send data to one another. Additionally or alternatively, only the group leader or only selected users can send data.

The system and method may also be used to collect data from multiple sensors without using an ISP and may comprise storing or processing the data locally before passing it on to the internet. For example, on a production line comprising multiple stages wherein each stage is furnished with multiple sensors. Each sensor collects data which is stored on a respective device. The production line may have a group leader which is arranged to use the system and method described herein to receive data from the each of the respective devices. The data being transmitted from each device to the group leader by a short range communication method in a peer to peer communication session as described herein. The group leader collates the data sent by the multiple sensors and sends the collated data to a control centre as one single transmission. The group leader may also process the data from the multiple sensors before transmitting the data to the control centre. Therefore a single transmission can be sent for a whole production line. Use of the method may reduce signalling between a production line and a control centre and reduce the number of devices that must be connected to the control centre.

The system and method may be used to alert users when their devices move into peer to peer communication range. The alert may utilise vibration of devices and/or flashing of pre-set screen which is user-configurable. If the users allow sharing the GPS location, they can also be seen on a map, Such systems may be useful in an airport arrivals lounge, for example. The first wireless device 202 shows details of the arriving second user (Name, arrival flight information, company, advertisement, and so on) on the first user's device automatically by retrieving it from the server and adding additional details manually if desired (advertisements for example). The data can be translated into another language, Thus, in an airport arrivals lounge, two users whose devices are known to each other can use the system and method to locate each other and send each other messages for identification. The two users can use this to identify each other, which is particularly useful if the users have not previously met in person. Similar advantages are apparent in other situations, for example when a user is being picked up by a taxi which he has ordered and which he wishes to correctly identify without having to approach each taxi or taxi driver he sees.

The invention claimed is:

1. A communication system comprising:
  a server on which there is stored a second device identifier, ID, for a second wireless device and a second user ID associated with a second user;
  wherein upon the server identifying that the second user ID is stored on a first wireless device, transmitting the second user ID and the second wireless device ID to the first wireless device to allow the first wireless device to associate the second wireless device with the second user;
  wherein upon the first wireless device identifying that the second wireless device is within peer to peer communication range of the first wireless device and the second user has set privileges of the second wireless device to allow peer to peer communication with the first wireless device, the first wireless device is configured to provide an indication, without interaction with the server, that the second wireless device is available for establishing a connection with the first wireless device for communicating with the second user;
  wherein following the indication that the second wireless device is available for establishing a connection, the first wireless device is arranged to establish, without interaction with the server, a peer to peer communication with the second wireless device for communicating with the second user;
  wherein a third wireless device is arranged to transmit to the server a third wireless device ID associated with the second user ID to indicate that the second user is using the third wireless device;
  wherein the server is arranged to store the third wireless device ID with the second user ID;
  wherein the server is arranged to transmit the second user ID and the third wireless device ID to the first wireless device;
  wherein the server is arranged to store both the second wireless device ID and the third wireless device ID with the second user ID; and
  wherein the server is arranged to transmit either the second wireless device ID and the second user ID to the first wireless device if the second wireless device was most recently used by the second user, or the server is arranged to transmit the third wireless device ID and the second user ID to the first wireless device if the third wireless device was most recently used by the second user.

2. The communication system of claim 1, wherein the peer to peer communication comprises a WiFi direct connection or a Bluetooth connection.

3. The communication system of claim 1, further comprising:
  deleting the second wireless device ID from the first wireless device; or
  deleting the second wireless device ID from the server.

4. The communication system of claim 1, wherein
  the server is arranged to transmit a code to the first wireless device and to the second wireless device; and
  the first wireless device is arranged to transmit the code to the second wireless device,
  wherein first wireless device is arranged to display an indication that the second user is available for peer to peer communication and the indication is displayed when the code sent by the first wireless device to the second wireless device matches the code sent by the server to the second wireless device and when the second wireless device is in peer to peer communication range of the first wireless device.

5. The communication system of claim 1, further comprising:
  closing a peer to peer communication session when the second wireless device is out of peer to peer communication range of the first wireless device, and wherein the first wireless device or the second wireless device is arranged to delete data shared in the peer to peer communication session from the server and receiving device, and wherein
    the first wireless device is arranged to automatically display an indication that the second wireless device is not in peer to peer communication range of the first wireless device; or the first wireless device is arranged to automatically re-establish a peer to peer communication session when the second wireless device is in peer to peer communication range of the first wireless device.

6. The communication system of claim 1, wherein:
the first wireless device or the second wireless device is arranged to close a peer to peer communication session in response to input from a user of the first wireless device or the second wireless device, and
the first wireless device or the second wireless device is arranged to delete data shared in the peer to peer communication session from the server and receiving device.

7. The communication system of claim 1, wherein:
if the second wireless device is not within peer to peer communication range, then the first wireless device and the second wireless device communicate via a router or a base station;
if the second wireless device moves out of peer to peer communication range of the first wireless device, then the first wireless device and the second wireless device are arranged to communicate via a router or a base station;
the wireless device ID is a MAC address, a Subscriber Identity Module number, SIM, a service set identifier, SSID, internet protocol, IP, address, or any combination thereof; and
the second wireless device is within peer to peer communication range of the first wireless device when a distance between the first wireless device and the second wireless device is less than 50 metres or when a signal strength for peer to peer communication between the first wireless device and the second wireless device is above a threshold level.

8. A method of communication in a communication system comprising a first wireless device and a second wireless device, wherein the second wireless device has a second wireless device ID and is associated with a second user ID to indicate that a second user is using the second wireless device, the method comprising:
identifying, by a server, that the second user ID is stored on the first wireless device;
transmitting, by the server, the second user ID and the second wireless device ID to the first wireless device upon the server identifying that the second user ID is stored on the first wireless device;
associating, by the first wireless device, the second wireless device with the second user;
identifying, by the first wireless device and without interaction with the server, that the second wireless device is within peer to peer communication range of the first wireless device and the second user has set privileges of the second wireless device to allow peer to peer communication with the first wireless device;
displaying, by the first wireless device, an indication that the second user is available for peer to peer communication based on the identifying;
establishing, by the first wireless device and without interaction with the server, a peer to peer communication with the second wireless device for communicating with the second user;
transmitting, from a third wireless device, to the server a third wireless device ID associated with the second user ID to indicate that the second user is using the third wireless device;
storing, by the server, the third wireless device ID with the second user ID;
transmitting, by the server, the second user ID and the third wireless device ID to the first wireless devices; and
storing, by the server, both the second wireless device ID and the third wireless device ID with the second user ID,
wherein the server transmits either the second wireless device ID and the second user ID to the first wireless device if the second wireless device was most recently used by the second user, or the server transmits the third wireless device ID and the second user ID to the first wireless device if the third wireless device was most recently used by the second user.

9. The method of claim 8, wherein the peer to peer communication comprises a WiFi direct connection or a Bluetooth connection.

10. The method of claim 8, further comprising:
deleting the second wireless device ID from the first wireless device; or
deleting the second wireless device ID from the server.

11. The method of claim 8,
wherein the transmitting, by the server, further comprises transmitting a code to the first wireless device and transmitting, by the server, the code to the second wireless device; and
transmitting, by the first wireless device, the code to the second wireless device,
wherein the indication, displayed by the first wireless device, that the second user is available for peer to peer communication is displayed when the code sent by the first wireless device to the second wireless device matches the code sent by the server to the second wireless device and when the second wireless device is in peer to peer communication range of the first wireless device.

12. The method of claim 8, further comprising:
closing a peer to peer communication session when the second wireless device is out of peer to peer communication range of the first wireless device,
deleting data shared in the peer to peer communication session from the server and receiving device,
and either
automatically displaying, by the first wireless device, an indication that the second wireless device is not in peer to peer communication range of the first wireless device; or
automatically re-establishing a peer to peer communication session when the second wireless device is in peer to peer communication range of the first wireless device.

13. The method of claim 8, further comprising:
closing a peer to peer communication session in response to input from a user of the first wireless device or the second wireless device, and
deleting data shared in the peer to peer communication session from the server and receiving device.

14. The method of claim 8, wherein:
if the identifying establishes that the second wireless device is not within peer to peer communication range, then the first wireless device and the second wireless device communicate via a router or a base station;
if the second wireless device moves out of peer to peer communication range of the first wireless device, then the first wireless device and the second wireless device communicate via a router or a base station;

the wireless device ID is a MAC Address, a Subscriber Identity Module number, SIM, a service set identifier, SSID, internet protocol, IP, address, or any combination thereof; and the second wireless device is within peer to peer communication range of the first wireless device when a distance between the first wireless device and the second wireless device is less than 50 metres or when a signal strength for peer to peer communication between the first wireless device and the second wireless device is above a threshold level.

* * * * *